United States Patent [19]

Baker et al.

[11] 4,247,483
[45] Jan. 27, 1981

[54] PRODUCTION OF ISO-α-ACIDS

[75] Inventors: Charles D. Baker, Uttoxeter; Derek R. J. Laws, Bexleyheath, both of England

[73] Assignee: Brewing Patents Ltd., England

[21] Appl. No.: 42,051

[22] Filed: May 24, 1979

[30] Foreign Application Priority Data

May 26, 1978 [GB] United Kingdom ............... 23220/78

[51] Int. Cl.$^3$ ............................................. C07C 45/67
[52] U.S. Cl. .................................................. 568/341
[58] Field of Search ......................... 260/586 D; 426/7

[56] References Cited

U.S. PATENT DOCUMENTS

| | | | |
|---|---|---|---|
| 3,364,265 | 1/1968 | Klingel et al. | 260/586 D |
| 3,751,266 | 8/1973 | Kuroiwa et al. | 260/586 D |
| 3,952,061 | 4/1976 | Koller et al. | 260/586 D |
| 4,160,787 | 7/1979 | Moll et al. | 260/586 D |
| 4,190,604 | 2/1980 | Burckhardt et al. | 260/592 |

FOREIGN PATENT DOCUMENTS 1064068 4/1967 United Kingdom ............... 260/586 D
1161787 8/1969 United Kingdom ............... 260/586 D

OTHER PUBLICATIONS

Moore, Physical Chemistry, pp. 358–359, (1962), Prentice Hall.

Primary Examiner—James H. Reamer
Attorney, Agent, or Firm—Wenderoth, Lind & Ponack

[57] ABSTRACT

A method of making an aqueous composition containing iso-α-acids by isomerizing α-acids, preferably obtained by extracting hops with liquid carbon dioxide or organic solvents, in an aqueous alkaline medium is characterized by providing one or more salts in solution in the isomerized reaction mixture at a molar equivalent concentration greater than that of the iso-α-acids, whereby the reaction mixture separates into an oily phase and an aqueous phase, the oily phase containing a higher concentration of iso-α-acids than the aqueous phase, and recovering an aqueous composition containing iso-α-acids by separating the oily phase from the aqueous phase. The preferred salt is potassium carbonate which also provides a suitable pH for isomerization.

10 Claims, No Drawings

PRODUCTION OF ISO-α-ACIDS

The present invention relates to the production of iso-α-acids by the isomerization of α-acids, such as may be obtained by extracting hops with suitable solvents.

The standard method of isomerizing α-acids is to heat them in a single phase aqueous alkaline medium. The present invention is based on the discovery that certain advantages can be obtained in the isomerization of α-acids when heating in aqueous alkaline conditions by recovering iso-α-acids in a separated aqueous iso-α-acid rich phase. The extraction of α-acids in a two-phase system has been previously suggested for example in British Patent Specifications Nos. 1,064,068 and 1,161,787. In these Specifications the two-phase system is water/organic solvent system and is used to partition the α-acids and other components in particular the β-acids of the hop extract used as a starting material, the α-acids being dissolved in the alkaline aqueous phase, the β-acids and other components being retained in the organic phase. The advantage of this arrangement is that the α-acids in the aqueous phase can be isomerized whilst at least reducing the production of undesired by-products in the isomerized preparation. The possibility of oxidizing the β-acids in the organic phase to hulupones which have potentially useful bittering properties is a feature of Specification No. 1,064,068.

In contrast to these prior art suggestions the present invention needs no organic solvents. This is beneficial because of the expense of organic solvents and the concern that exists, particularly on the part of Public Health Authorities, on the toxicity of some of the organic solvents used in such prior art proposals.

The present invention accordingly provides a method of making an aqueous composition containing iso-α-acids by isomerizing α-acids in an aqueous alkaline medium, characterized by providing one or more salts in solution in the isomerized reaction mixture at a molar equivalent concentration greater than that of the iso-α-acids, whereby the reaction mixture separates into an oily phase and an aqueous phase, the oily phase containing a higher concentration of iso-α-acids than the aqueous phase, and recovering an aqueous composition containing iso-α-acids by separating the oily phase from the aqueous phase.

The formation of separate "oily" and "aqueous" phases is critical to the invention. The mechanism by which the separate phases are formed appears to be a form of salting out. Even though it appears that salting out is the mechanism of their formation the two phases, in particular the oily phase, are unusual. The phase which we refer to herein as the "oily phase" is an alkaline aqueous solution of iso-α-acids, or rather a salt or salts thereof, of relatively high concentration. Typically the concentration of iso-α-acids in the "oily phase" is from 15 to 55% w/w, the precise figure in any case depending on the overall composition of the reaction mixture and particularly on the concentration of iso-α-acids and salts and their ratio in the mixture as a whole.

The phase we refer to herein as the "aqueous phase" is a more dilute alkaline aqueous solution of iso-α-acids salt or salts, typically having a concentration of from 0.2 to 2.5% w/v again depending upon the particular composition of the reaction mixture.

The terms "oily phase" and "aqueous phase" thus both represent aqueous solutions but of differing compositions. The reason for the separation of the reaction mixture in this way is not understood and the phenomenon is highly surprising. These two phases are described respectively as "oily" and "aqueous" phase primarily because of their appearance. The oily phase has the usual appearance of an oil the viscosity of which depends on the concentrations of iso-α-acids and other salt(s) in the reaction mixture. Generally, the higher the overall concentration of iso-α-acids in the reaction mixture the higher the concentration of iso-α-acids salt(s) in the oily phase and the higher the viscosity of the oily phase. We have obtained oily phases having viscosities (assessed visually) varying between a mobile fluid through a honey-like consistency to approaching a greasy semi-solid, depending on the iso-α-acids salt(s) concentration. At high iso-α-acids salt(s) concentrations, the oily phase sometimes becomes opalescent and we believe that this results from a partial "water-in-oil" emulsion of the aqueous phase in the oily phase.

The aqueous phase has the visual appearance expected of an alkaline salt solution.

We have above mentioned two phases which we have described as "oily" and "aqueous" respectively. In some circumstances a third phase which we refer to herein as a "waxy" phase or layer may be obtained. The formation of such "waxy" phases and layers is discussed in more detail below.

Iso-α-acids (isohumulones) are acids derived from α-acids (humulones) by isomerization. α-Acids when obtained from hops and thus the iso-α-acids obtained by isomerization of them are mixture of compounds differing in the nature of an alkyl group in an acyl side chain respectively to the cyclohexyl and cyclopentyl rings. As is well known the alkyl groups in naturally occurring humulones generally have from 3 to 6 carbon atoms, a large proportion commonly being isopropyl and isobutyl groups. The particular proportions of the different alkyl groups depend on and is a characteristic of the variety (cultivar) of hops from which the humulones and (eventually) isohumulones are obtained. It can thus be seen that the effective molecular weight of any particular sample of α-acids or iso-α-acids produced from hops depends on the particular source and especially the variety of hop from which they are obtained. For the purpose of this specification we have adopted a figure of 365 for the effective molecular weight of humulones and isohumulones (as such). The relationships between weight and molar concentrations are related to this figure and if humulones having a different effective molecular weight are used the concentration figures may need minor adjustment in this regard.

We have indicated above that we believe that the invention revolves around a salting out effect albeit of an unusual kind. This belief is based primarily on the observation that although the formation of separate phases is concentration dependent it is nevertheless possible to obtain separate phases over a wide range of iso-α-acids concentrations. The practical application of the effect underlying the invention is not dependent on the specific mechanism which actually operates. The comments above based on our hypothesis of salting out are set out to aid understanding of the invention.

Although separate oily and aqueous phases can be obtained over a wide range of overall iso-α-acids concentrations the practical ranges of concentrations are rather narrower. Thus if the overall iso-α-acids concentration is less than 25 gl$^{-1}$ (0.0685 molar) the volume of the oily phase as compared with the aqueous phase is so small that separating the oily phase may prove difficult. Additionally at such a low iso-α-acids concentrations the amount of alkali, both in absolute terms and particularly in relation to the iso-α-acids obtained, needed to raise the pH to one practical for isomerization and the amount of salt(s) necessary to effect the phase separation become so large as to be impractical and uneconomic. The practical maximum concentration of iso-α-acids is limited by the desire to effect separation of the oily and aqueous phases readily and precisely, in particular in that the phase boundary between the oily and aqueous phases is sharp. As is mentioned above at higher iso-α-acids concentrations the viscosity of the oily phase increases and eventually becomes so high that separation of oily and aqueous phases becomes difficult using conventional separation techniques. In addition to the increase in viscosity of the oily phase with increasing iso-α-acids concentration it seems that the relative densities of the aqueous and oily phases alter. Normally the oily phase is more dense than the aqueous phase. At such high iso-α-acids concentrations the difference in densities can become very small and the aqueous phase may, indeed, become heavier than the oily phase. These density reversals can make separation very difficult. In particular if the overall concentration of iso-α-acids is above 250 gl$^{-1}$ (0.68 molar) adequate separation of the phases may require specialised techniques and may thus become uneconomic. Thus the practical limits on concentration are generally from 25 to 250 gl$^{-1}$ (0.068 to 0.68 molar).

We prefer to operate within a more limited range of concentrations in order to obtain optimum results both technically and economically. The concentration range we prefer is from 50 to 180 gl$^{-1}$ (0.137 to 0.49 molar) optimally from 80 to 160 gl$^{-1}$ (0.22 to 0.44 molar). The particular figure chosen in any individual case will depend on the precise nature of the materials used and on the operating technique employed and especially as to whether the cascade technique described later herein is used.

The concentration of salt used is, as a minimum that sufficient to effect phase separation. The maximum concentration is ultimately limited by the solubility of the salts used. However, in practice the maximum salt concentration possible will not generally be used because the use of such large quantities of salt would be unduly expensive and the resulting viscous oily phase would be difficult to handle. The actual concentrations which will usually be used depend on the nature of the salt, as is discussed below, and on the concentration of the iso-α-acids. The isomerization reaction is carried out in alkaline medium and usually the amount of alkali will be at least equivalent to the α-acids present. However, as is known, α-acids are effectively dibasic whereas iso-α-acids are effectively monobasic. To avoid any difficulties which might arise during separation from having a mixture of iso-α-acids and iso-α-acids salts it is desirable that the amount of alkali present is at least equivalent to the iso-α-acids and generally the concentration of alkali will be such that, at separation of the oily and aqueous phases, the iso-α-acids are present as their salts. As indicated above this is conveniently accomplished by using an amount of alkali equivalent to the α-acids at the start of isomerization. Further to this the concentration of alkali during isomerization will usually be chosen to provide a suitable pH for isomerization. This is discussed in more detail below but as a general guide we have found that concentrations providing alkali equivalent to the iso-α-acids or to the α-acids give pH values sufficiently high to effect adequately rapid isomerization.

To effect phase separation the salt concentration must be in excess of the iso-α-acids equivalent concentration. This excess concentration is inversely related to the concentration of the iso-α-acids. Thus, at high iso-α-acids concentration the excess concentration of salts needed is relatively low and vice versa. The boundary relationship between the excess salt concentration and iso-α-acids concentration for phase separation appears to approximate inverse proportionality in the concentration ranges of iso-α-acids enumerated above. Thus, at an iso-α-acids concentration of 200 gl$^{-1}$ the excess concentration of $K_2CO_3$ necessary to effect phase separation is about 0.25 molar (0.50 gm equivalents) and at 50 gl$^{-1}$ iso-α-acids about 1.50 molar (3.0 gm equivalents). The phase separation is also dependent upon the pH of the system.

Practical excess salt concentrations will generally be chosen to be in excess of the boundary conditions typically by at least 50%. We have found that using excess salt concentrations of 2 to 4 times greater than the boundary conditions is particularly convenient although amounts up to six times the boundary excess concentrations can be advantageous in maximising yields especially if the cascade technique is not employed.

These considerations yield a range of salt concentrations for practical operation of typically from 1 to 2.5 and particularly from 1.1 to 1.8 gm. equiv. l$^{-1}$. The most appropriate concentrations in any particular case depending as indicated above on the concentration of the iso-α-acids. The weight and molar concentrations of the salt will, of course, depend on the molecular weight and stoichiometry of the salt or salts actually used.

Because the salt(s) used need to be soluble in aqueous alkaline media they will normally be those of alkali metals. We have used sodium and potassium salts, but as is described below they produce different results. Other alkali metals may be satisfactory but are not likely to be economic. Metals other than the alkali metals rarely produce (cationic) salts soluble at alkaline pHs or rarely produce soluble isohumulates (iso-α-acids salts) and will thus not be suitable. Further other metals are frequently toxic when in soluble form and would not be suited to the production of a food product. Also, with particular reference to transition and heavy metals such as iron other metals can catalyse degradation reactions in the α-acids or the iso-α-acids. The anion of the salt must be adequately non-toxic, stable at alkaline pH and produce adequately soluble salts. Further, the anion should not be an oxidizing agent in the aqueous conditions used or this may result in degradation of the desired product. Suitable anions include chloride, carbonate, sulphate, phosphate and acetate. Hydroxides may be used, e.g. as a source of alkali for "topping up" in the cascade process described below, but their strongly alkaline nature requires care because iso-α-acids hydrolysed at very strongly alkaline pH's. Suitable buffering may avoid this problem with the caustic alkalis. However, although other anions can be used it is particularly convenient to use carbonate because this is self-buffering to a large extent and can thus be used as the source of alkali for the isomerization and as the salt for effecting phase separation. This can enable the system to be kept simple and convenient. This can be a significant practical advantage.

Above we briefly mention that the behaviour of systems using sodium and potassium differ. Sodium salts, especially sodium carbonate, can be used but the sodium salts of iso-α-acids produce much more viscous oily phases than potassium salts at equivalent concentrations. This makes separation of the aqueous and oily phases and subsequent handling of the oily phase rather more difficult. The use of potassium salts gives relatively much less viscous oily phases than does sodium thus generally extending the upper concentration limits possible. Mixtures of sodium and potassium salts give results between the results for sodium and potassium salts used separately. We expect that potassium salts will be used in commercial operation and think it probable that the convenience of using potassium carbonate will make it the material of preference.

Thus, in a further aspect, the invention provides a method of making iso-α-acids which comprises isomerizing α-acids in an aqueous solution of potassium carbonate whereby to provide an isomerized reaction mixture in which substantially all the α-acids have been isomerized to iso-α-acids, providing potassium carbonate, or optionally another potassium salt, in solution in the isomerized reaction mixture at a concentration of from 1 to 2.5 g. equivalents $l^{-1}$, more particularly from 1.1 to 1.8 g. equivalents $l^{-1}$, and at an overall iso-α-acids concentrations of from 25 to 250, more particularly 60 to 160 $gl^{-1}$, whereby the isomerized reaction mixture separates into an oily and an aqueous phase, the oily phase containing a higher concentration of iso-α-acids than the aqueous phase, and recovering iso-α-acids from the isomerized reaction mixture by separating the oily phase from the aqueous phase.

The salt(s) added to the system to effect phase separation can either be included in the reaction mixture before isomerization or added after isomerization. Using potassium salts especially potassium carbonate, it seems that the choice is mainly one of operational convenience. However, there may be advantages in having all the salt e.g. potassium carbonate, present at the start. This avoids any difficulties which may arise through coprecipitation effects if the salt is added as a solid or through dilution if added as a solution after isomerization. One further point is that the separation of the third "waxy" layer described below may be made more difficult.

It is well known that the isomerization of α-acids is sensitive to the presence of impurities, which under isomerization conditions can give rise to products which, on addition of the isomerized product to beer, give rise to off flavours or aromas. Thus in the present invention the α-acids used as starting materials should be of adequate quality to avoid this problem. In commercial practice we expect that the α-acids will be obtained by extracting them from hops. The invention is particularly applicable to the high quality primary extracts which can be obtained by extracting hops with liquid carbon dioxide. The technique of extracting hops with liquid carbon dioxide to produce a product which can be isomerized without requiring intermediate purification is described in our co-pending U.K. Patent Applications Nos. 42613/76 and 18480/77 (cognate) and the corresponding West German Specification No. P2745829. Particular techniques for making high quality carbon dioxide extracts are described in our co-pending Application No. 1944/77 and the corresponding West German Specification No. P 28 01 843.

Briefly summarised hop extracts of suitable purity can be made by extracting hops with liquid carbon dioxide at a temperature typically between $-5°$ C. and $+15°$ C. more particularly at about 10° C. under a pressure equal or slightly greater e.g. up to 10% greater, than the vapour pressure of liquid $CO_2$ at the extraction temperature. Extraction is generally effected by passing the liquid $CO_2$ through a column of hops and recovering the extract by evaporating the liquid $CO_2$. The gaseous $CO_2$ is usually condensed and recycled through the extraction column. Further details of the process and descriptions of suitable apparatus for performing the extraction are given in the aforementioned Specifications.

The extract obtained using such techniques is a high purity product which generally contains α-acids, β-acids, hop oil and some water and usually no more than barely perceptible amounts of the impurities such as uncharacterised soft resins, hard resins, tannins and chlorophyll observed in primary organic solvent extracts. However, we have found particularly if the hops are extensively or exhaustively extracted e.g. to maximise the yield of α-acids, some of the fats and waxes present in hops can also be extracted. Such fats and waxes may also be present in primary organic solvent extracts but are removed during purification of the α-acids prior to isomerization. The presence of substantial amounts of fats and waxes in a liquid $CO_2$ hop extract could substantially detract from the value of the extract since the fats and waxes may produce off flavours during conventional aqueous alkaline isomerization processes. Amounts of fats and waxes of as little as 0.2% by weight of the extract can produce substantial off flavours on isomerization. Further if a large proportion of the fats and waxes are extracted they can amount to 20% by weight of the extract and occasionally even more.

The presence of any fats and waxes in the liquid $CO_2$ hop extract can readily be detected because they are insoluble in methanol whereas the α-acids, β-acids and hop oil are readily soluble. This test affords a means for ensuring the purity of the extract albeit possibly with reduced yield.

We have found very surprisingly that carrying out the isomerization according to the present invention provides a means whereby substantial proportions of fats and waxes in hop extracts can be tolerated. Maintaining the concentrations of the components of the reaction mixture such that the oily phase is more dense than the aqueous phase enables the fats and waxes to be separated as a waxy third layer of lesser density than the aqueous phase. Reducing the concentration of salt(s) so as to carry out the isomerization without phase separation (into oily and aqueous phases) with subsequent addition of salt(s) to effect separation into oily and aqueous phases does not appear to prevent isolation of the fats and waxes as a third waxy layer. However, it may be more convenient to remove the waxy layer from the isomerized reaction mixture prior to addition of the further salt(s). We do not know whether the separate waxy phase effectively prevents production of off flavour components during isomerization or whether it is just that any off flavour components produced are concentrated in the waxy layer. The waxy layer, when present, can readily be removed from the remainder of the reaction mixture by skimming or other conventional separation techniques.

The following Table 1 gives a typical analysis for a liquid $CO_2$ extract not containing any fats and waxes, the figures being wt. %.

TABLE 1

| | |
|---|---|
| α-acids | 40 to 75, usually 40 to 65 |
| β-acids | 20 to 40, usually 25 to 35 |
| total resins (including α- and β-acids) | 70 to 98, usually 80 to 95 |
| hop oil | up to 10, usually up to 3 |
| water | up to 5, usually 2 to 5 |

The figures for water may be higher than 5% if the hops extracted are 'wet' e.g. when green hops are extracted. As is mentioned above fats and waxes when present may constitute up to 20% by wt. of the extract.

The high quality of liquid $CO_2$ extracts makes them particularly suitable for carrying out isomerizations according to the invention and in a further aspect the invention includes an integrated extraction and isomerization process which comprises extracting hops with liquid $CO_2$ to obtain a primary hop extract of high purity and, preferably without specific further purification, isomerizing the α-acids in the extract to iso-α-acids and recovering the iso-α-acids by the phase separation technique of this invention.

Our prior U.K. Specification No. 1501098 describes and claims a method of obtaining high quality hop oil preparations. As is described in our co-pending Applications referred to above the hop oil may be recovered from the extract under the general conditions of Specification No. 1501098 and in the context of the integrated extraction and isomerization process set out above we do not regard this as specific purification, but such a hop oil isolation step is within the scope of this invention.

The table does not quote figures for fats and waxes since these can be tolerated although they are usually regarded as impurities. In purified solvent extracts the residual amounts of fats and waxes will typically be less than 0.2% and in liquid $CO_2$ extracts where the extraction is stopped before any substantial amounts of fats and waxes are extracted the amount is frequently not detectable and usually so small as not to be quantifiable i.e. assessed as being less than 0.1%.

Apart from the concentrations of the compounds of the reaction mixture the general conditions of the isomerization are in principle the same as for conventional aqueous alkaline isomerizations.

Isomerization of α-acids under aqueous alkaline conditions is usually carried out at superambient temperatures because the isomerization proceeds more rapidly at elevated tempertures. Typically the temperature is at least 90° C. for most of the reaction time and the reaction mixture is conveniently heated to boiling point which is usually slightly above 100° C. because of the presence of the dissolved species. Higher temperatures and thus shorter reaction times could be achieved by carrying out the reaction under superatmospheric pressure. Where the α-acids are in a liquid $CO_2$ hop extract then the extract will usually contain hop oil, unless this is deliberately removed, and boiling the isomerization mixture enable removal of the hop oil by steam distillation. This is advantageous because treatment of hop oil at about 100° C. in alkaline solution can cause substantial degradation of the hop oil with the production of off flavours and/or aromas. Removal of the hop oil with the steam evolved on boiling minimises the danger of adverse effects on the iso-α-acids as a result of such degradation.

The pH at which aqueous alkaline isomerization is carried out is generally a compromise between two factors. The first is that with increasing alkalinity the reaction proceeds more rapidly and the second that with increasing alkalinity the rate at which iso-α-acids are hydrolysed and thus degraded to humulinic acids by scission of the isohexenoyl side chain also increases. Generally the balance between these factors means that starting pH's are selected in the range 8 to 10. The pH at the end of isomerization is generally higher than at the start because α-acids are dibasic and iso-α-acids are monobasic and thus isomerization releases one equivalent of alkali per mole of iso-α-acids produced. The increase in pH is typically from 1 to 2 units depending on the specific alkali used and the concentration of alkali and iso-α-acids. Generally the pH at the end of isomerization is from 9 to 11. Generally pH's much in excess of 11 are avoided particularly towards the end of isomerization when there are high iso-α-acid concentrations to minimise production of humulinic acids. The avoidance of pH's above 11 is, as has briefly been indicated above one of the reasons for using non-caustic alkalis in the process of the invention.

Isomerization is generally substantially complete in about 1 hour although optimum times may vary e.g. between 0.5 and 2 hours. The criteria for selecting a satisfactory isomerization time include the balance between completion of isomerization and formation of humulinic acids referred to above in connection with the pH. Indeed the isomerization temperature is a factor in this balance but the convenience of carrying out the isomerization by boiling is so great that this is usually regarded as fixed for practical purposes. The isomerization time will be chosen such that substantially all the α-acids in the starting material are isomerized. Usually a small proportion of α-acids remain unisomerized but this will usually be less than 5% and typically less than 2% of the original amount. We do not expect the skilled man to have any serious difficulty in selecting a suitable time.

There have been many suggestions that the isomerization can be speeded up by using catalyst. The catalysts usually suggested are metal ions or salts usually Mg or Ca compounds. We have found that such compounds can accelerate the isomerization but tend even at low concentrations to make the oily layer more viscous and more difficult to separate. Use of concentrations of 5% w/v on the reaction mixture or higher can cause the mixture to become excessively viscous. The use of such catalysts is thus not particularly preferred in the present invention.

One further minor point of practical importance is that the isomerization will generally be carried out in an inert atmosphere to avoid oxidative degradation of the α- or iso-α-acids. This is a common precaution. $N_2$ can be used to produce a satisfactory inert atmosphere.

Separation of the reaction mixture into oily and aqueous phases, and possibly also a waxy phase, may conveniently be effected by ceasing to stir the reaction mixture. While the separation temperature is not very critical, we have found that separation of the phases takes place more rapidly and completely at temperatures above 40° C. When isomerization is effected in the presence of the one or more salts with stirring at elevated temperature, it is convenient to switch off heating and stirring at the same time and to allow the reaction mixture to separate while cooling.

As is discussed in our earlier applications referred to above liquid $CO_2$ hop extracts and probably also solvent extracts are sensitive to the presence of some heavy metals notably iron. Thus the isomerization and separation processes according to the invention are best carried out in suitably inert vessels e.g. glass lined or of stainless steel. However, we believe that the problem is not so great as in the extraction process because the reaction mixture is fairly strongly alkaline thus separating the solubility of $Fe^{II}$ and $Fe^{III}$ ions.

We refer above to the possibility of performing the invention by a cascade technique. Briefly this involves using at least a part of the aqueous phase, after separation from the oily phase, as at least part of the raw materials for a further isomerization. One important reason for using such a cascade technique is that the aqueous phase contains an appreciable and valuable proportion of iso-α-acids. As described above the aqueous phase will typically contain from 0.2 to 2.5% w/v of iso-α-acids and since the volume of the aqueous phase will generally be larger and may be up to 3 or 4 times that of the oily phase the proportion of iso-α-acids in the aqueous phase may be up to 40% and will typically be at least 5%. The cascade technique provides one way of recovering at least a part of the iso-α-acids which remains in solution in the aqueous phase.

Accordingly the invention further provides as a specific feature a cascade method of making an aqueous composition containing iso-α-acids characterized by the steps of (a) isomerizing α-acids to iso-α-acids in an aqueous alkaline medium, (b) providing one or more salts in solution in the isomerized reaction mixture at a molar equivalent concentration greater than that of the iso-α-acids, whereby the reaction mixture separates into an oily phase and an aqueous phase, the oily phase containing a higher concentration of iso-α-acids than the aqueous phase, (c) recovering an aqueous composition containing iso-α-acids by separating the oily phase from the aqueous phase, and (d) returning at the least part of the aqueous phase to act as at least part of the aqueous alkaline medium for at least one further isomerization according to steps (a) to (c).

The aspects of the invention relating to the concentrations of the components of the reaction mixture and the selection of alkali and salt(s), to the use of an integrated process involving liquid $CO_2$ hop extracts and to the separation of fats and waxes are applicable to this aspect of the invention relating to the cascade technique.

The basic limitation on the effective number of times the aqueous phase can be completely recycled is the build up of impurities. Using liquid $CO_2$ hop extracts the level of impurities in the aqueous phase after five cycles is not quantifiably greater than after a single pass. From this we believe that a substantial number of cycles should be possible. When a solvent hop extract is used we do not expect to be able to run so many cycles of the cascade because of the significant, although small, proportions or impurities such as uncharacterized soft resins, hard resins, chlorophyll and tannins. The cascade technique can be operated in a balanced way by removing a fraction of the aqueous phase at each cycle adding fresh water to make up the necessary volume (Of course, addition of fresh water will anyway be necessary at least from time to time to make up for processing losses.), the proportion of aqueous phase removed on each cycle being selected to maintain a balance between maximum yield and the build up of undesired impurities.

As an alternative to or in addition to the cascade technique the iso-α-acids remaining in the aqueous phase can be recovered separately. The purification technique described in our German Specification No. P 2745829 can be used. Additionally it may be advantageous to remove at least part of the salt(s) e.g. by dialysis. However, particularly if the iso-α-acids are intended for immediate or near immediate use then the presence of the salt(s) may not be disadvantageous.

The initial main product of the method of the present invention is the oily phase separated from the aqueous phase. The oily phase contains iso-α-acids in solution in alkali and may contain β-acids, especially if the extract is a liquid $CO_2$ extract, residual levels of α-acids and impurities such as small quantities of humulinic acids. We have found that this product is suitable for addition to wort, e.g. in the copper (kettle), or in the fermentation vessel or to beer after fermentation. Generally because the iso-α-acids have not been specifically purified they may not be suitable for addition to bright beer after final filtration because the impurities tend to produce haze and reduce iso-α-acid utilisation. However, if an α-acid extract containing only a low proportion of β-acids is used as the starting material, then the iso-α-acid composition produced may be suitable for direct addition to bright beer after final filtration. One particular advantage of this iso-α-acid preparation is that being at high concentration further concentration to reduce its volume is not necessary. This presents a significant saving as compared with previous isomerizates.

The advantages of the present invention may be summarised as follows:

(i) α-acids are isomerized in concentrated aqueous solution (typically 10–20%) with consequent savings in equipment and energy costs. Compare German Patent Specification No. P2745829 which teaches isomerization of α-acids in a single phase aqueous system at a concentration of 0.15%

(ii) the oily phase recovered contains the iso-α-acids at high concentration (typically 20–50%). This is particularly useful for products which have to be transported long distances prior to addition to beer.

(iii) the method avoids contamination of the product with waxes. The waxes separate as a third layer on top of the aqueous phase and do not contaminate the oily phase/aqueous phase interface.

(iv) Partial purification takes place, since humulinic acid and other unidentified hop components remain in the aqueous phase.

The following Examples illustrate the invention. In the Examples various hop extracts have been used and data on the extraction technique used and the analysis of the extracts are given in Table 2. Examples 1 and 2 illustrate the process of the invention, Example 3 illustrates the cascade process of the invention and Example 4 illustrates the use of iso-α-acids produced according to Examples 1 and 3 in the bittering of beer. Example 5 shows a five-stage cascade process, Example 6 uses a high α-acids extract, Example 7 reports brewery trials using the two-phase products, Example 8 shows isomerization of an organic solvent hop extract, and Example 9 shows the use of various different salts.

EXAMPLE 1

10.0 g of Target hop extract (No. 1 in Table 2) containing 5.4 g of $\alpha$-acids were placed in a 100 ml glass reaction vessel fitted with a cohobation head, reflux condenser and magnetic stirrer. The apparatus was purged with nitrogen. Potassium carbonate (4.14 g in 50 ml water) was added and the reaction vessel was heated by means of an oil-bath. The reaction mixture was stirred vigorously and boiled for 1 hour under reflux. During boiling hop oils present in the extract were distilled over and collected in the cohobation head.

The reaction mixture was allowed to cool to slightly above room temperature and to separate into a clear, orange lower oily phase (15.9 g) and an upper aqueous phase (40 ml). A small amount of waxy material formed a thin third layer on top of the aqueous layer.

The products were analysed by column chromatography on Sephadex (J. Inst. Brew., 1972, 78, 57). Table 3 gives the yields of iso-$\alpha$-acids and recoveries of unchanged $\alpha$-acids and of humulinic acids. The $\beta$-acids in the original hop extract (31.3% w/w) were recovered unchanged, their partition between the aqueous and oil phases being similar to that for iso-$\alpha$-acids.

EXAMPLE 2

10.0 g of Target hop extract (No. 1 in Table 2) were isomerized for 1 hour with potassium carbonate (4.14 g in 25 ml water) by the technique described in Example 1 except that the concentration of $\alpha$-acids and potassium carbonate were higher.

The resulting oil phase (13.8 g), which was a thick emulsion similar in consistency to the original hop extract, exhibited variable density relative to the aqueous phase (18 ml) with temperature. At room temperature it was a viscous lower phase, whilst a warm temperatures it was a more mobile upper phase.

Analyses of the products are given in Table 3.

EXAMPLE 3

12.2 g of Northern Brewer hop extract (No. 2 in Table 2) containing 5.4 g of $\alpha$-acids were isomerized for 1 hour with potassium carbonate (4.14 g in 50 ml water) by the technique described in Example 1. The reaction mixture was allowed to cool and the lower oil phase (16.6 g) was removed. Additional hop extract (12.2 g) and potassium carbonate (2.1 g in 10 ml water) were added and the mixture was boiled under reflux with vigorous stirring for a further 1 hour 20 minutes.

When stirring was stopped the mixture separated into three phases:- a lower oil phase (21.9 g), an aqueous phase (38.5 ml) and a waxy material (3.6 g) on top of the aqueous phase. The waxy material, which was solid at room temperature but liquid at 40° C., was soluble in ether but insoluble in methanol, and was probably derived from the waxes (15% w/w) present in the original hop extract.

Analyses of the products are given in Table 3.

TABLE 2

| Extract No. | 1 | 2[1] |
|---|---|---|
| Example No. | 1 and 2 | 3 |
| Hop Type | Target | Northern Brewer |
| Extraction Medium | liquid $CO_2$ | liquid $CO_2$ |
| Extraction Time (hrs) | 1½ | 9 |
| Extraction Temp. (°C.) | 7 | −15 |
| Extract Analysis | | |
| $\alpha$-acids (wt%) | 54.0 | 44.3 |
| $\beta$-acids (wt%) | 31.3 | 25.7 |
| hop oil (wt%) | 7.3 | 7.2 |
| water (wt%) | 7.0 | 5.3 |
| fats & waxes (wt%) | 0.3 | 15.3 |
| other. | 0 | 2.2[2] |

[1] Extract No. 2 was the product of an attempt to exhaustively extract all liquid $CO_2$ solubles from the hops by liquid $CO_2$ at a low temperature.
[2] Analysed as uncharacterised soft resins.

TABLE 3

| Example No. | 1 | 2 | 3 | |
|---|---|---|---|---|
| concn of $\alpha$-acids isomerized (% w/v) | 10.8 | 21.6 | 10.8 | 10.8 |
| Carbonate (% w/v) | 8.3 | 16.6 | 8.3 | 8.3 |
| Analysis of Products | | | | |
| (i) Oily phase | | | | |
| iso-$\alpha$-acids (% w/w) | 21.3 | 27.9 | 17.9 | 21.6 |
| yield of iso-$\alpha$-acids (%) | 62.8 | 71.5 | 54.9 | 87.8 |
| $\alpha$-acids (% w/w) | 1.6 | 6.3 | 1.4 | 1.4 |
| recovery of $\alpha$-acids (%) | 4.8 | 16.1 | 4.2 | 5.6 |
| humulinic acids (% w/w) | 0.4 | 0.4 | 0.5 | 0.4 |
| yield of humulinic acids (%) | 1.4 | 1.4 | 2.0 | 2.3 |
| (ii) Aqueous phase | | | | * |
| iso-$\alpha$-acids (% w/v) | 1.7 | 0.2 | 1.7 | |
| yield of iso-$\alpha$-acids (%) | 12.7 | 0.7 | 5.9 | |
| $\alpha$-acids (% w/v) | 0.08 | 0.03 | 0.07 | |
| recovery of $\alpha$-acids (%) | 0.6 | 0.1 | 0.2 | |
| humulinic acids (% w/v) | 0.09 | 0.04 | 0.1 | |
| yield of humulinic acids (%) | 0.9 | 0.2 | 0.5 | |

*Cascade process. Yields are based on total input of $\alpha$-acids

NOTE:

The analyses for the resins given in Table 3 appear to show from 10 to 20% of $\alpha$-acids unaccounted for. We believe that this is an artefact of the analysis on Sephadex underestimating the amounts by this margin. We have repeated the analyses substituting Dowex AG.1-X4 as the chromatography medium and this gives analyses giving a substantially complete account of the $\alpha$-acids in the starting material without significantly altering the relative proportions of the various components in the extract.

EXAMPLE 4

UTILISATION, GUSHING AND FOAM STABILITY STUDIES

Samples of the oil phases from Examples 1 and 3 were diluted to a concentration of 2.75 g iso-$\alpha$-acids/liter with distilled water. Portions of these solutions were added to ½ pint bottles of Light Ale to give a concentration of 10 mg of iso-$\alpha$-acids/liter. The gushing potentials determined by a box shaking procedure (J. Inst. Brew., 1972, 78, 302); the effect on foam stability by the Rudin method (J. Inst. Brew., 1957, 63, 506) and the increase in bitterness (Institute of Brewing Recommended Methods of Analysis, 1977) were determined on the same samples. The results are set out in Table 4.

TABLE 4

| Example No. | 1 | 3 |
|---|---|---|
| Hop Extracted | Target | N. Brewer |
| Gushing (g/275 ml) | Nil | Nil |
| Bitterness (B.U.) | | |
| Control | 20.2 | 20.9 |
| + IHE* | 26.8 | 29.1 |
| Utilisation (%) | 66 | 82 |
| Foam stability (½ life secs) | | |
| Control | 89 | 84 |

TABLE 4-continued

| Example No. | 1 | 3 |
|---|---|---|
| + IHE* | 82 | 78 |

*IHE = isomerized hop extract

EXAMPLE 5

FIVE STAGE CASCADE ISOMERIZATION 15.6 g of Northdown hop extract containing 41.8% $\alpha$-acids and 27.5% $\beta$-acids were placed in a 100 ml glass reaction vessel fitted with a cohobation head, reflux condenser and magnetic stirrer. The apparatus was purged with nitrogen. Potassium carbonate (5.0 g in 50 ml water) was added and the reaction vessel was heated by means of an oil-bath. The two phase mixture was stirred vigorously and boiled for 1½ hours under reflux. The hop oils (0.6 ml) were distilled over and collected in the cohobation head. Stirring was stopped, the reaction mixture was allowed to cool and the clear mobile, lower oil phase (21.0 g) was removed. Additional hop extract (15.6 g) and potassium carbonate (2.5 g in 7.5 ml water) were added and the isomerization was continued for a further 2 hours. This sequence was repeated for a total of 5 isomerizations.

Table 5 gives the iso-$\alpha$-acids contents and yields of the separate oil phases. The total weight of oil phase from 78 g extract was 144.9 g containing 20.6% iso-$\alpha$-acids in 91.7% yield, 4.7% of the original $\alpha$-acids were recovered in the oil phase. The final aqueous phase (18 ml) contained 3.3% iso-$\alpha$-acids (1.8% yield). Ion exchange chromatography showed no deterioration in the quality of successive oil phases, with all the impurities/reaction by-products being concentrated in the aqueous phase.

TABLE 5

| YIELDS OF OIL PHASE IN CASCADE ISOMERIZATION | | | | | |
|---|---|---|---|---|---|
| Cascade No. | 1 | 2 | 3 | 4 | 5 |
| Weight (g) | 21.0 | 28.0 | 32.3 | 23.0 | 40.6 |
| Iso-$\alpha$-acids (% w/w) | 24.8 | 19.6 | 21.5 | 14.5 | 21.9 |
| Yield for stage (%) | 79.9 | 84.2 | 106.5 | 51.2 | 136.4 |
| Total Yield (%) | 79.9 | 82.0 | 90.2 | 80.4 | 91.6 |

EXAMPLE 6

ISOMERIZATION OF HIGH $\alpha$-ACIDS EXTRACT 9.4 of hop extract containing 72.1% $\alpha$-acids and 8.0% $\beta$-acids were isomerized for 2 hours with potassium carbonate (5.2 g in 45 ml water) as described in Example 1.

The resulting oil phase (13.1 g) was a slightly viscous emulsion containing 47.1% iso-$\alpha$-acids (91.3% yield), 1.2% $\beta$-acids, 0.8% humulinic acids and 5.7% $\beta$-acids. The aqueous phase (36 ml) contained 0.94% w/v iso-$\alpha$-acids (5% yield).

EXAMPLE 7

BREWERY TRIALS OF ISOMERIZED EXTRACT

Target hop extract (3×1.5 kg) containing 47% $\alpha$-acids and 29% $\beta$-acids was isomerized as described in Example 1. The $\beta$-acids were removed from one half of the combined oil phases (total weight 5.9 kg, 29.6% iso-$\alpha$-acids).

A low $\beta$-acids extract (0.8 kg) from Northdown hops containing 60% $\alpha$-acids and 11.5% $\beta$-acids was also isomerized as described in Example 1 and the oil phase (1.03 kg) containing 39.4% iso-$\alpha$-acids removed.

The oil phases were diluted to 1% iso-$\alpha$-acids with deionised water and added to cask conditioned beers 24 hrs before racking as a partial replacement of hops. The addition rates and utilisations found for the bright beers are given in Table 6. Any losses of bitterness which have occurred on fining are assumed to be due to the isomerized extract.

TABLE 6

| ADDITION OF ISOMERISED EXTRACTS TO BEER | | | | |
|---|---|---|---|---|
| Type of Extract | Volume of beer treted (hectolitres) | Iso-$\alpha$-acids added (mg/liter) | $\beta$-acids added (mg/liter) | Utilisation of iso-$\alpha$-acids (%) |
| Normal | 650 | 13.0 | 8.8 | 67 |
| Low $\beta$-acids | 333 | 12.0 | 2.1 | 82 |
| $\beta$-acids -removed | 560 | 15.1 | 0.7 | 84 |

EXAMPLE 8

ISOMERIZATION OF HEXANE EXTRACT 13.5 g of a commercial hexane hop extract containing 40% $\alpha$-acids and 27% $\beta$-acids was isomerized with potassium carbonate (4.14 g in 50 ml water) for 1¼ hr as described in Example 1. After cooling a further 2.1 g of potassium carbonate were added with stirring to dissolve.

The relatively mobile, dark green oil phase (15 g) contained 31.4% iso-$\alpha$-acids (87% yields) and the aqueous phase (40 ml) contained 0.97% iso-$\alpha$-acids (7.2% yield). A wax layer (1.3 g) solidified on top of the aqueous layer which also contained some insoluble material.

EXAMPLE 9

The effect of different cations and anions on the two-phase formation was examined by adding equimolar amounts of a range of salts to aliquots of a single phase isomerization product containing 9.3% iso-$\alpha$-acids (assuming complete isomerization) and 1.0 base/ $\alpha$-acids ratio.

The salt being examined (1.0 to 1.5 base/$\alpha$-acids molar ratio, 2.0 to 3.0 equivalent ratio) was weighed into a 10 ml graduated centrifuge tube and 10 ml of the 9.3% iso-$\alpha$-acids solution was added. The tube was stoppered, the salt dissolved by repeated inversions, and the mixture attemperated at 60° C. for 15 min. to allow the phases to separate. The volumes of the two phases were recorded after cooling to room temperature and are set out in Table 7, in which the figures indicate the volume in ml of the oily phase formed.

TABLE 7

| EFFECT OF DIFFERENT IONS ON TWO PHASE SEPARATION | | | |
|---|---|---|---|
| | Anion | | |
| | Carbonate | Chloride | Sulphate |
| Cation (mole ratio) | Volume (ml) and appearance of oily phase | | |
| Potassium | | | |
| (+ 1.0) | nil | 1.8 clear, mobile | nil |
| (+ 1.5) | 2.7 clear, mobile | 2.1 clear, mobile | 2.7 clear, mobile |
| Sodium | | | |

TABLE 7-continued
EFFECT OF DIFFERENT IONS ON TWO PHASE SEPARATION

| Cation (mole ratio) | Anion: Carbonate | Chloride | Sulphate |
|---|---|---|---|
| | Volume (ml) and appearance of oily phase | | |
| (+ 1.0) | 1.5 clear, fairly mobile | 1.55 clear, viscous | |
| (+ 1.5) | 2.1 clear, fairly mobile | 1.7 solid cold mobile warm | 1.8 semi-solid |
| Ammonium (+ 1.5) | | 1.9 solid cold viscous hot | 1.65 solid cold viscous hot |

We claim:

1. In a method of making an aqueous composition containing iso-α-acids by isomerizing α-acids in an aqueous alkaline medium,
the improvement which consists in providing an isomerized reaction mixture containing iso-α-acids at a concentration of 25 g/l to 250 g/l and containing also one or more stable, non-toxic non-oxidizing salts in solution at a molar equivalent concentration greater than that of the iso-α-acids, whereby the reaction mixture separates into an oily phase and an aqueous phase, the oily phase containing a higher concentration of iso-α-acids than the aqueous phase, and recovering an aqueous composition containing iso-α-acids by separating the oily phase from the aqueous phase.

2. A cascade method of making an aqueous composition containing iso-α-acids characterized by the steps of
   (a) isomerizing α-acids to iso-α-acids in an aqueous alkaline medium, at an iso-α-acid concentration of 25 g/l to 250 g/l,
   (b) providing one or more stable, non-toxic, non-oxidizing salts in solution in the isomerized reaction mixture at a molar equivalent concentration greater than that of the iso-α-acids, whereby the reaction mixture separates into an oily phase and an aqueous phase, the oily phase containing a higher concentration of iso-α-acids than the aqueous phase,
   (c) recovering an aqueous composition containing iso-α-acids by separating the oily phase from the aqueous phase, and
   (d) returning at the least part of the aqueous phase to act as at least part of the aqueous alkaline medium for at least one further isomerization according to steps (a) to (c).

3. A method as claimed in claim 1 or claim 2 wherein the one or more salts are provided in solution in the aqueous alkaline medium before the isomerization step.

4. A method as claimed in claim 1 or claim 2, wherein the isomerized reaction mixture contains from 50 to 180 gl$^{-1}$ of iso-α-acids.

5. A method as claimed in claim 1 or claim 2, wherein the one or more salts are used at a concentration of 1 to 2.5 gm. equiv. l$^{-1}$.

6. A method as claimed in claim 1 or claim 2, wherein potassium carbonate is used as the salt.

7. A method as claimed in claim 1 or claim 2, wherein the starting α-acids are contained in a hop extract which also contains one or more fats and waxes, which form a separate waxy phase of lower density than the aqueous phase.

8. A method as claimed in claim 1 or claim 2, wherein separation of the oily and aqueous phases is effected at a temperature of from 40° C. to the boiling point of the reaction mixture.

9. A method as claimed in claim 1 or claim 2, wherein the α-acids have been extracted from hops using liquid carbon dioxide.

10. A method as claimed in claim 1 or claim 2, wherein the α-acids have been extracted from hops using an organic solvent.

* * * * *